June 17, 1969  E. C. BEASON ET AL  3,450,587
CUTTING AND HEAT SEALING THERMOPLASTIC FILM
Filed March 31, 1966  Sheet 1 of 3
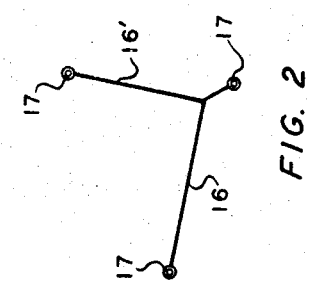
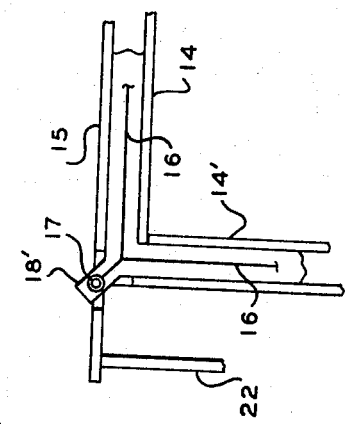
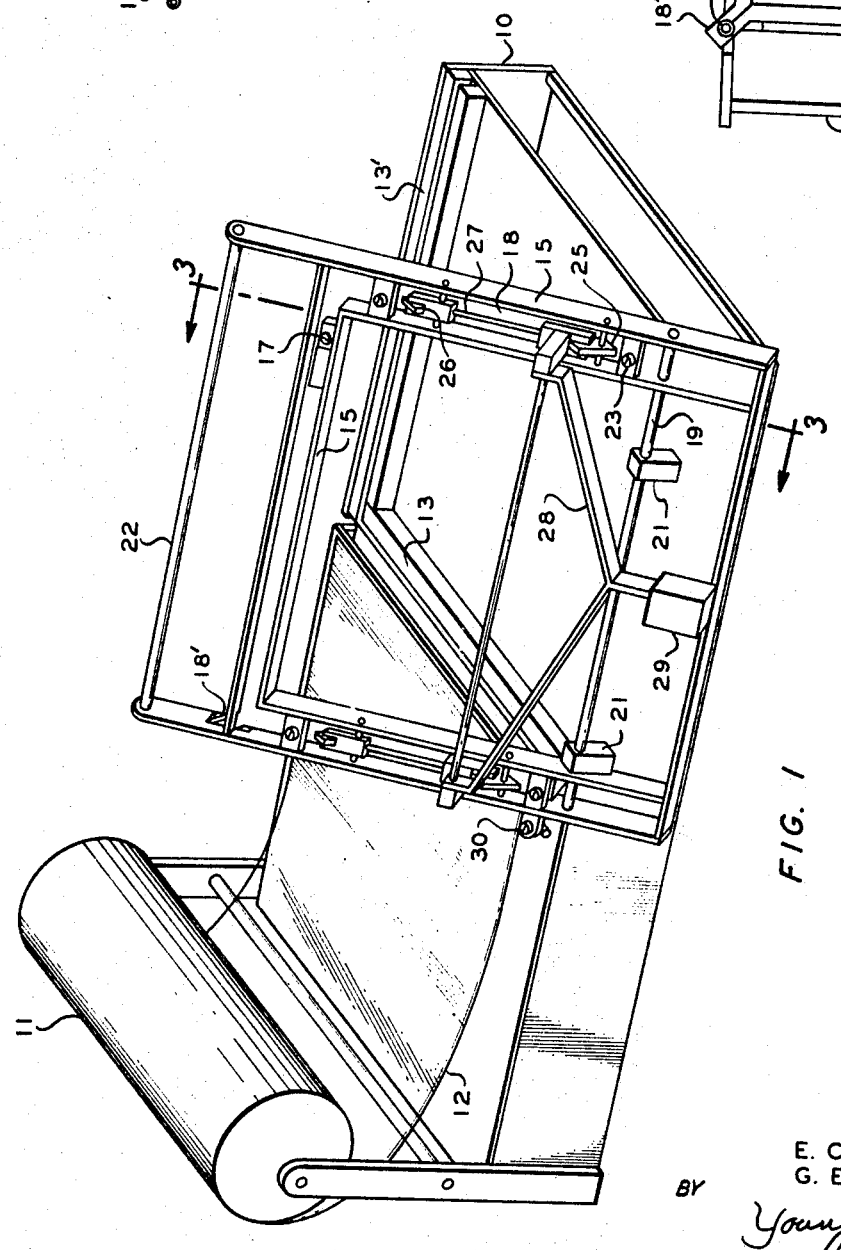
INVENTORS
E. C. BEASON
G. E. MADER, JR.
BY
*Young and Quigg*
ATTORNEYS

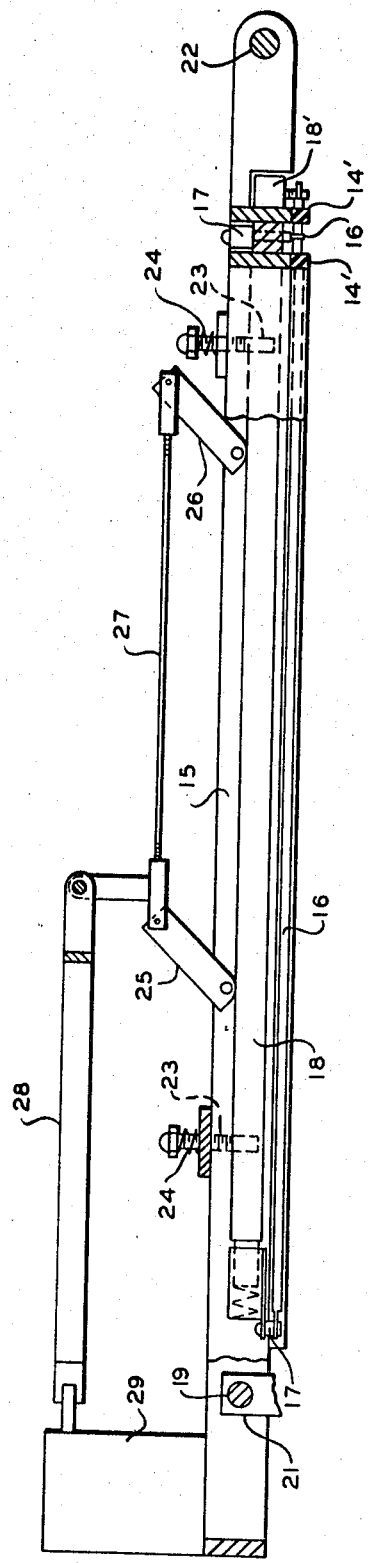

United States Patent Office 3,450,587
Patented June 17, 1969

3,450,587
CUTTING AND HEAT SEALING THERMOPLASTIC FILM
Elmer C. Beason, Cincinnati, Ohio, and George E. Mader, Jr., Bartlesville, Okla., assignors to Phillips Petroleum Company, a corporation of Delaware
Filed Mar. 31, 1966, Ser. No. 539,179
Int. Cl. B65b *61/10, 57/00*
U.S. Cl. 156—389                                4 Claims

ABSTRACT OF THE DISCLOSURE

This invention provides for an apparatus of cutting and heat sealing a plurality of layers of thermoplastic film and includes a sealing wire which is maintained at an essentially constant temperature during the stand-by seal cut periods of the cycle and is heat impulsed for high temperature thermoplastic burn-off for a few seconds following the seal-cut operation.

---

This invention relates to a method and means for cutting and heat sealing thermoplastic film including both oriented and unoriented film. In one aspect this invention relates to a method and means for cutting and heat sealing thermoplastic film in the operation of packaging articles by wrapping such articles with thermoplastic film and heat sealing the film which forms the wrapping.

It is an object of the invention to provide a method for cutting and heat sealing a plurality of layers of thermoplastic film so that a positive and strong seal is obtained with both oriented and unoriented thermoplastic film. It is also an object of this invention to provide a method and means for packaging articles in an envelope of thermoplastic film so that a strong seal is obtained at the sealed edges of the envelope with either oriented or unoriented plastic film without modification of the procedure or the device when changing from one type of film to another. Still another object of the invention is to provide a method and means for gripping the layers of film to be severed and sealed in a manner so that a strong seal results regardless of the orientation characteristics of the film. Still another object of this invention is to provide a method and means for heating the sealing wire to a sufficiently high temperature for a few seconds during the cycle following the sealing operation to burn off polymer which may have adhered to the sealing wire. Other and further objects of the invention will be apparent to those skilled in the art upon reading the disclosure including the detailed description of the invention and the drawing wherein:

FIGURE 1 is a perspective view of the apparatus of the invention;

FIGURE 2 is a view of the wire which does the cutting and sealing;

FIGURE 3 is a view along line 3—3 of FIGURE 1;

FIGURE 4 shows the area where the junction of the heating wires extends beyond the frame.

Figure 5:
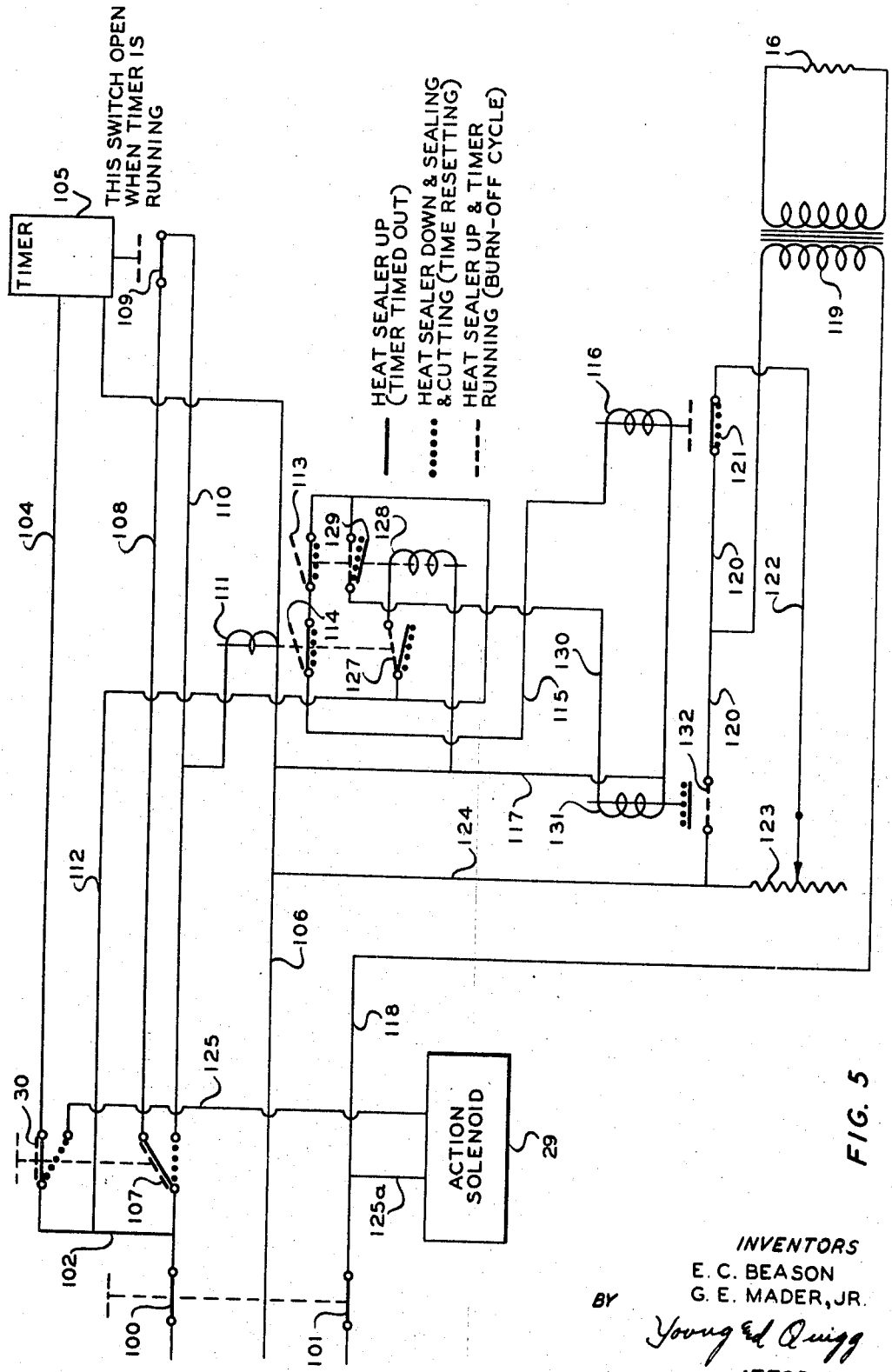
FIGURE 5 shows an electrical circuit which can be used in the device of FIGURE 1.

We have discovered that a thermoplastic film cutting and sealing device that is used to seal unoriented or oriented films of different kinds of thermoplastics can be operated substantially continuously by causing the sealing wire or ribbon to be heated to a sufficiently high temperature to burn off polymer which adheres thereon after each sealing and cutting operation. According to our invention the sealing wire or ribbon is maintained at an essentially constant temperature during the stand-by and seal-cut periods of the cycle and is heat impulsed for high temperature polymer burn-off for a few seconds following the seal-cut operation.

In the operation of devices for cutting and sealing film it has been necessary to stop the operation after several cycles and clean the cutting and sealing ribbon or wire to remove therefrom polymer which is molten during the cutting and sealing operation and which adheres to the hot sealing and cutting element. Attempts to maintain the cutting and sealing element at a sufficient temperature to burn off adhering polymer have not been successful because the high temperature of the heating element causes non-uniform seals and will often melt the thermoplastic material so that an imperfect seal is obtained.

In operation of the device according to our invention the clamping frame closes first as the operating handle is moved downward to clamp the film layers firmly together on each side of the zone or line to be cut and sealed. When the operating handle is moved to clamp the film layers, a switch is operated which activates an electrical circuit so as to energize a solenoid which, through a connecting linkage, rotates a plurality of cams which move the ribbon downwardly through the layers of film, cutting and sealing them together. When the handle is raised, the solenoid is deactivated and a timer is activated so as to operate a circuit to raise the temperature of the sealing element to the burn-off temperature. When the timer runs out the burn-off circuit is opened and the cycle is completed. The timer is set for an impulse time of usually 3 to 5 seconds. This time can be determined according to the kind of thermoplastic film being cut and will be set at whatever time is required to burn off the polymer during each cycle. The timer resets automatically at the end of each cycle.

Referring to FIGURE 1 of the drawing, a bag sealer is shown comprising a work base 10 having a roll 11 of folded plastic film mounted thereon with the fold 12 at the near side. A pair of grooved pressure bars 13 and 13' are positioned on the work table and opposed grooved pressure bars 14 and 14', shown in FIGURE 4, are mounted on press frame indicated at 15. The opposed pressure bars serve to grip and hold the plastic film and the grooves provide a space for a hot ribbon or wire 16, shown in FIGURE 2, to pass through the film, simultaneously cutting and sealing the edges of the bag. The hot wire 16 is carried by insulating posts 17, shown in FIGURES 2 and 3, on rectangular frame 18. A projection 18' supports the hot wire 16 at the angle where 16 and 16' are joined together as shown in FIGURE 2.

As indicated in FIGURE 3, the press frame 15 is pivotally secured to work table 10 by means of shaft 19 supported on work table 10 by blocks 21. Frame 18 which carries the hot wire 16 is supported on press frame 15 by means of bolts 23 which are spring biased by springs 24 to maintain the hot wire 16 within the groove of grooved pressure bars 14 and 14'. Cam members 25 and 26 are pivotally secured to press frame 15 and to shaft 27 which is actuated through linkage 28 to solenoid 29 so that when solenoid 29 is actuated the cam members 25 and 26 are moved to vertical position, thus forcing hot wire 16 from the groove of pressure bars 14 and 14' toward the grooves of pressure bars 13 and 13' sufficiently to cut and seal the layers of plastic film.

Solenoid 29 is actuated by switch 30 when press frame 15 is operated by handle 22 to closed position.

The operation of the heating cycle is shown in the electrical circuit of FIGURE 5. Switches 100 and 101 are operated simultaneously and when closed current flows through switch 100, line 102, switch 30, line 104, timer 105 and to ground line 106. Current also flows through switch 107, line 108, switch 109, line 110 and coil 111 to ground 106. Current also flows through line 112, switches 113 and 114, line 115, coil 116 and line 117 to ground 106. Current also flows through switch 101, line 118, heater coil 119, line 120, switch 121, line 122, variable resistance 123 and line 124 to ground 106.

When switches 100 and 101 are closed the heater coil 119 is operated to maintain the heater ribbon at cutting and sealing temperature and timer 105 is run out. The sealer handle is in up position.

When the sealer handle is depressed switches 30 and 107 are operated so that timer 105 is reset and current flows through switch 30 and lines 125 and 125a, actuating solenoid 29 which lowers the heater ribbon through the layers of plastic film, cutting and sealing them. Current flows through switch 107, line 110 and coil 111 to ground 106. Current also continues to flow through lines 102 and 112, switches 113 and 114, line 115, coil 116 and line 117 to ground 106. Current also continues to flow through line 118, heater coil 119, line 120, switch 121, line 122, resistance 123, and line 124 to ground 106.

When the sealer handle is raised the timer 105 is actuated. Current flows through switch 30, line 104 and timer 105 to ground 106; however the timer 105 holds switch 109 open for the duration of the time period. With no current flowing through coil 111, switch 114 is opened and switch 127 is closed so that current flows via line 112 through coil 128 and line 117 to ground 106. Current also flows through switch 129, line 130, coil 131 and line 117 to ground 106. Current now flows through line 118, coil 119, line 120, switch 132 and line 124 to ground 106. This condition obtains for the duration of the running of timer 105. When timer 105 runs out switch 109 closes, switches 113, 114 and 116 close; switches 127, 129 and 132 open and the system is ready for the next cycle.

A film cutting and sealing device substantially as shown in the drawing has been operated successfully in cutting and sealing oriented and unoriented polyethylene films ranging in thickness from about 0.5 to 10 mils. The film was made of high density polyethylene, e.g., 0.950 to 0.960 gm./cc. Such thermoplastic materials up to a thickness of about 20 mils can be cut and sealed satisfactorily.

The temperature of the wire or ribbon will ordinarily be maintained at about 400 to 600° F. during the cutting and sealing period of the cycle and the temperature will be raised to about 900° F. for the burn-off period which will usually be about 3 to 5 seconds. It should be understood that higher or lower temperatures may sometimes be desired for special operations. The impulse time period will be selected according to the material being cut and sealed and the temperature of the wire when impulsed.

In the above apparatus the timing devise was an Agastat type NE-12, 115 volt, 60 cycle timer obtained from Agastat Instruments Co., Elizabeth, N.J. This timer resets when the press frame is lowered to the work table opening switch 30.

Coil 131 and switch 132 comprises a first relay. Coil 116 and switch 121 comprise a second relay. These relays were Adams and Westlake mercury relays obtained from Adams and Westlake, Elkhart, Ind.

Coil 111 and switches 114 and 127 comprise a third relay. Coil 128 and switches 129 and 113 comprise a fourth relay. The third and fourth relays were Potter and Brunfeldt type PR 11 AY relays obtained from Potter and Brunfeldt Division of American Machine and Foundry Co., Princeton, Ind.

Pressure bars 13, 13' 14 and 14' were made of silicone rubber. Any heat resistant, resilient material can be used as facing material for these clamping bars.

The above were the specific elements utilized; however, it should be understood that other devices can be substituted to obtain the same operation and those named are merely exemplary.

That which is claimed is:

1. In apparatus for making and sealing thermoplastic bags wherein a press frame is pressed upon a folded strip of thermoplastic material disposed upon a work table so as to grip the unsealed layers of thermoplastic between opposing longitudinally grooved bars positioned on said press frame and said work table respectively, the combination therewith of:
   a wire support frame operatively connected to said press frame;
   a wire supported on said wire support frame so as to be positioned in the grooves of the bars on said press frame;
   a first electrical circuit including said wire adapted to apply sufficient electrical energy to said wire to maintain said wire at a substantially constant temperature;
   means to move said wire of the grooves of said press frame through the layers of thermoplastic material and toward the grooves of the work table when the press frame is pressed upon the work table;
   a second electrical circuit including said wire and a timing device adapted to apply additional electrical energy to said wire when said press frame is removed from said work table so as to raise the temperature of the wire to a selected temperature higher than said substantially constant temperature for a selected period of time indicated by said timing device.

2. The apparatus of claim 1 wherein the timing device is reset when the press frame is pressed upon the folded strip of thermoplastic material disposed on the work table.

3. The apparatus of claim 1 wherein the press frame is pivotally mounted on the work table.

4. The apparatus of claim 1 wherein the means to move said wire of the grooves of the press frame through the layers of thermoplastic material comprises an electromagnetic device included in a third circuit and wherein said first, second and third circuits are integrated and comprise a first and second switch connected to operate simultaneously to apply current to said first circuit;
   a third switch operated by pressing the press frame upon the folded strip of thermoplastic material disposed on the work table to apply current to said third circuit and to reset said timing device in said second circuit; and
   a fourth switch operated by said timing device to apply current to said second circuit.

References Cited

UNITED STATES PATENTS

| 2,726,706 | 12/1955 | Hakomaki | 156—515 |
| 3,009,851 | 11/1961 | Madsen | 156—515 |
| 3,015,600 | 2/1962 | Cook | 156—515 |
| 3,234,072 | 2/1966 | Dreeben | 156—515 |
| 3,293,099 | 12/1966 | Stark | 156—389 |

DOUGLAS J. DRUMMOND, *Primary Examiner.*

U.S. Cl. X.R.

156—515